Oct. 6, 1970      O. W. SCHOEN, JR      3,532,270

PARTIAL PRESSURE LOW LEVEL HUMIDITY GENERATOR

Filed Feb. 3, 1969      2 Sheets-Sheet 1

OSCAR W. SCHOEN JR.
INVENTOR.

BY

ATTORNEY

Oct. 6, 1970  O. W. SCHOEN, JR  3,532,270
PARTIAL PRESSURE LOW LEVEL HUMIDITY GENERATOR
Filed Feb. 3, 1969  2 Sheets-Sheet 2

OSCAR W. SCHOEN JR
INVENTOR.

BY
J. M. St. Amand
ATTORNEY

United States Patent Office 3,532,270
Patented Oct. 6, 1970

3,532,270
PARTIAL PRESSURE LOW LEVEL HUMIDITY GENERATOR
Oscar W. Schoen, Jr., Ontario, Calif., assignor to the United States of America as represented by the Secretary of the Navy
Filed Feb. 3, 1969, Ser. No. 795,784
Int. Cl. G05d 22/00
U.S. Cl. 236—44                                   5 Claims

ABSTRACT OF THE DISCLOSURE

A low dew point temperature generator system for adding extremely small and controlled quantities of moisture to dry air making use of a chamber divided by a semipermeable membrane.

---

The invention herein described may be manufactured and used by or for the Government of the United States of America for governmental purposes without the payment of any royalties thereon or therefor.

BACKGROUND OF THE INVENTION

A relatively inexpensive low dew point temperature generator system has been devised with a calculated accuracy comparable to the detection accuracies of commercial dew point measuring instruments. The present solution to the problem of adding extremely small and controlled quantities of moisture to dry air differs fundamentally from the usual practice of saturating completely all or some divided portion of an air sample prior to a final operation, thus easing the control requirements of the system.

The systems described in FIGS. 1, 2 and 3 are typical of the usual prior art approaches to creating a desired relative humidity value.

The "Two Pressure" method shown in FIG. 1 is explained ideally through Dalton's Law of Partial Pressures and a representative P-V-T diagram for water, FIG. 4.

In FIG. 1 the relative humidity, RH, is described by the empirical equation below, arrived at by E. R. Weaver and R. Riley, J. Research NBS 40, 169 (1948) RP 1865; E. R. Weaver, Analytical Chemistry 23, 1076 (1951).

$$RH = \frac{p}{p_s} = \frac{p_E}{p_i} \cdot \frac{1 - K_1 P_E + K_2 P_E^2}{1 - K_1 P_i + K_2 P_i^2}$$

where
$p$ = partial pressure of water vapor in expanded air.
$p_s$ = saturation pressure of water vapor in expanded air at temperature of $p$.
$P_E$ = total pressure of expanded air, absolute.
$P_i$ = total pressure of high pressure air, absolute.
$K_1 = (1.8)10^{-4}$ for pressure in p.s.i.a.
$K_2 = (1.4)10^{-8}$ for pressure in p.s.i.a.

Dalton's law states that operations on the water vapor constituent of an air sample may be considered independently of the presence of gaseous air. Referring to FIG. 4, the points $p_s$ and $p$ on the $T_2$ isotherm represent a sample of saturated vapor that has undergone isothermal expansion. Since the definition of relative humidity is $p/p_s$, the principle of this method is clear. Measurements, however, are made of total pressure but again through Dalton's law, and assuming ideal gas conditions, the ratio of total pressures is valid. Corrections for departure from ideal conditions should be made, though, and an empirical correction factor has been determined by E. R. Weaver above. The system accuracy is dependent upon control accuracies over the air mass flow rate and the completeness of saturation. As a low dew point temperature generator, however, the system is not practical since extremely large expansion ratios are required.

The "Two Temperature" method is shown in FIG. 2 where $$\text{Rel. Hum.} = \frac{p}{p_s} = \frac{p_o}{p_s} \cdot \frac{P_1}{P_o} \text{ where } \frac{P_1}{P_o} \text{ corrects for } p \neq p_o$$

$p_o$ = saturation pres. of water vapor at temp. $t_o$ — values taken from standard tables
$p_s$ = saturation pres. of water vapor at temp. $t_1$ $t_o$ = saturation temp.
$t_1$ = elevated temp.
$P_o$ = total pres. of air at temp. $t_o$, absolute
$P_1$ = total pres. of air at temp. $t_1$, absolute
$p$ = partial pres. of water vapor at temp. $t_1$
$p_s$ = saturation pres. of water vapor at temp. of $p$.

The method of FIG. 2 is explained by reference to a representative, Pressure Temperature P-T, diagram for water, FIG. 5 where: curve A follows the P-T relationship dictated by the thermal and bulk modulus properties of the liquid; curve B follows the saturated P-T relationship; and, curve C follows the P-T gas laws. Points $p_o$ and $p_e$ represent a sample of air that has been raised in temperature above its saturation temperature at constant volume (curve C). The relative humidity is given by either $p/p_s$ or $p_e/p_s$ and it is apparent that total pressure conditions must be monitored throughout the process and necessary corrections made. This precaution is required since, when removed from saturated conditions, the partial pressure of the water vapor is almost directly affected by changes in total pressure. The important thing to remember is that the water vapor partial pressure ratio used in determining relative humidity must be along an isotherm. As a dew point temperature generator this system would be used in the "reverse" direction, i.e.—an air sample is saturated at a higher temperature and then cooled to the desired dew point temperature level. This approach requires accurate control of saturation completeness, air mass flow rate, and condensing (dew point) temperature.

The "Divided Flow" method shown in FIG. 3 requires accurate division of a stream of dry air into two branches, completely saturating the air in one branch, and recombining before entry into the test chamber. The relative humidity generated in this system is numerically equal to the fraction of air that passes through the saturator, with but small error, ("Divided Flow, Low-Temperature Humidity Test Apparatus"—A. Wexler, Research Paper RP-1894, Journal of Research NBS, vol. 40, June 1948).

In this system:

$$\frac{W}{W_s} = K$$

where $W_s$ = lbs. $H_2O$/lb. dry air out of saturator
$W$ = lbs. $H_2O$/lb. dry air after mixing
$K = m_2/m_1$ = fraction of air through saturator $$W = \frac{M_w}{M_a} \cdot \frac{p}{P - p}$$

where $M_w$ = molecular wgt. of water vapor
$M_a$ = molecular wgt. of dry air
$p$ = partial press. of water vapor
$P$ = total pressure $$\therefore K = \frac{\frac{M_w}{M_a} \cdot \frac{p}{P - p}}{\frac{M_w}{M_a} \cdot \frac{p_s}{P - p_s}} = \frac{p}{p_s} \cdot \frac{P - p_s}{P - p} = RH \cdot \frac{P - p_s}{P - p}$$

$$= RH = K \cdot \frac{P - p}{P - p_s}$$

At low dew points and ∴ at low partial pressures, $RH \cong K$. The system acuracy using this method depends upon the control accuracy over the air mass flow ratio through the proportioning valve, uniformity of drying of one stream, and completeness of saturation of the other stream. The air mass flow ratio through a proportioning value is highly dependent on downstream pressures, and a pressure variation in one stream will cause a variation in the other; thus the error is compounded since the numerator and denominator in the ratio are affected in opposite directions.

It should be noted here that one operation in common with the prior art systems described is that an air stream is completely saturated and then operated upon again in some manner in order to approach the desired final conditions.

SUMMARY OF THE INVENTION

The present device consists of a pressurized dry air source directed via a regulated pressure reducing valve, into a critical flow nozzle and finally through a chamber divided by a semipermeable membrane where the dry air is routed over the membrane and into a moisture measuring instrument. The opposite side of the chamber is partially filled with distilled water at a controlled temperature, and the membrane is in contact with dry air on one side and air-water vapor on the other so that the mass flow rate of water vapor through the membrane is dictated by the difference in water vapor partial pressure across the membrane.

The system described herein is designed to allow the addition of extremely small quantities of water vapor to a dry air stream. The mass flow rate of dry air is controlled by utilizing the critical flow nozzle operating supersonically, and the mass flow rate of water is controlled by the partial pressure difference of water vapor across the selective, semipermeable membrane. The air flow rate is essentially dependent on the nozzle inlet pressure, controllable to about two parts in $10^{+4}$ of the regulating value inlet pressure. The water mass flow rate is dependent on the vapor partial pressure difference, controllable within the limits of about 1:1 correspondence between humidifier temperature and dew point temperature.

Other applications using this approach would include removing moisture accurately as a means of environmental chamber control.

Other objects and many of the attendant advantages of this invention will become readily appreciated as the same becomes better understood by reference to the following detailed description when considered in connection with the accompanying drawings wherein.

DESCRIPTION OF THE INVENTION

Figure 1:
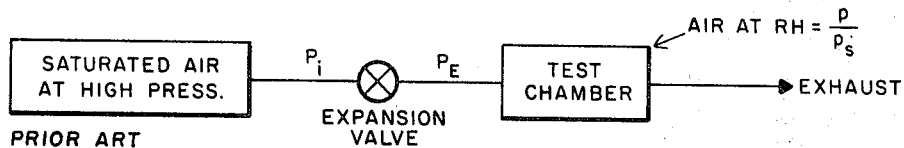
FIGS. 1, 2 and 3 show prior-art methods of creating a desired relative humidity value.
Figure 2:
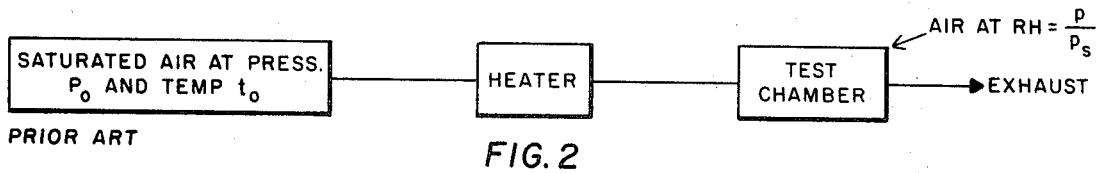
Figure 3:
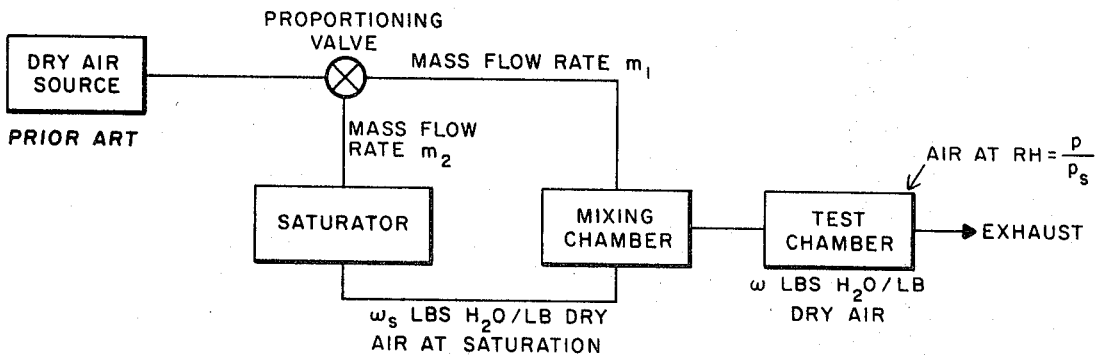
Figure 4:
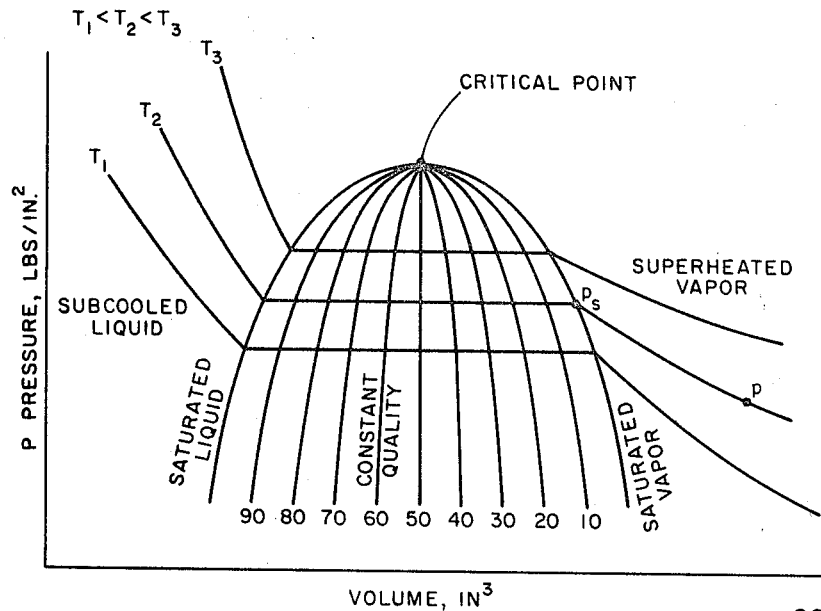
FIG. 4 is a pressure-volume-temperature, P-V-T, diagram for water.
Figure 5:
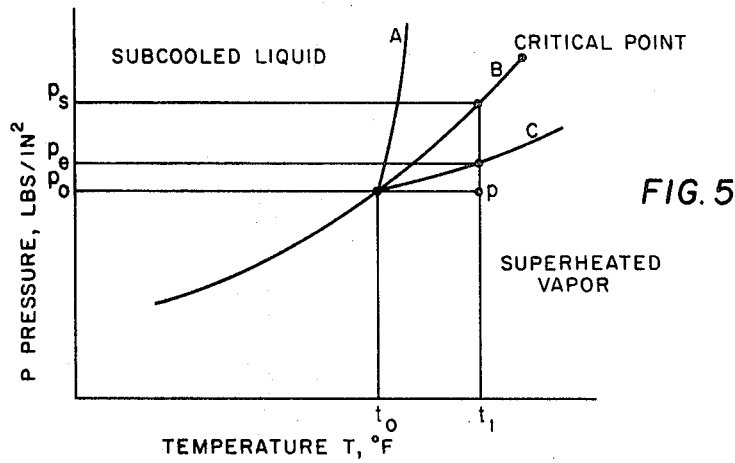
FIG. 5 is a pressure-temperature, P-T, diagram for water.

The "Partial Pressure" method (FIG. 6) consists of a pressurized dry air supply 30, a precision balanced pressure regulator 32 (e.g., "Veriflow" PN–41210641), a critical flow nozzle 34, a heat exchanger 36 and what will be termed as an "osmotic" humidifying chamber 38. The osmotic pressure is the difference in total pressures between the dry air and moist air sides of membrane 39 required to prevent water vapor diffusion, but the term has commonly come to refer to any partial pressure resulting in osmotic flow.

Critical flow nozzle 34 as a flow control device has the property of constant mass flow rate independent of variations in downstream pressure fluctuations. The mass flow rate is, however, linearly dependent on upstream pressure thus the use of a precision pressure regulator is required. The advantage of constant mass flow rate with small pressure changes due to downstream components is realized as long as the flow nozzle is supersonic and as long as a suitable throat profile is used. This will ensure a constant flow coefficient over the range of operating pressures ("A Review of Critical Flowmeters for Gas Flow Measurements," E. T. Arnberg, Paper No. 71–WA–181, Transactions of the ASME, Journal of Basic Engineering, circa 1961).

Figure 6:
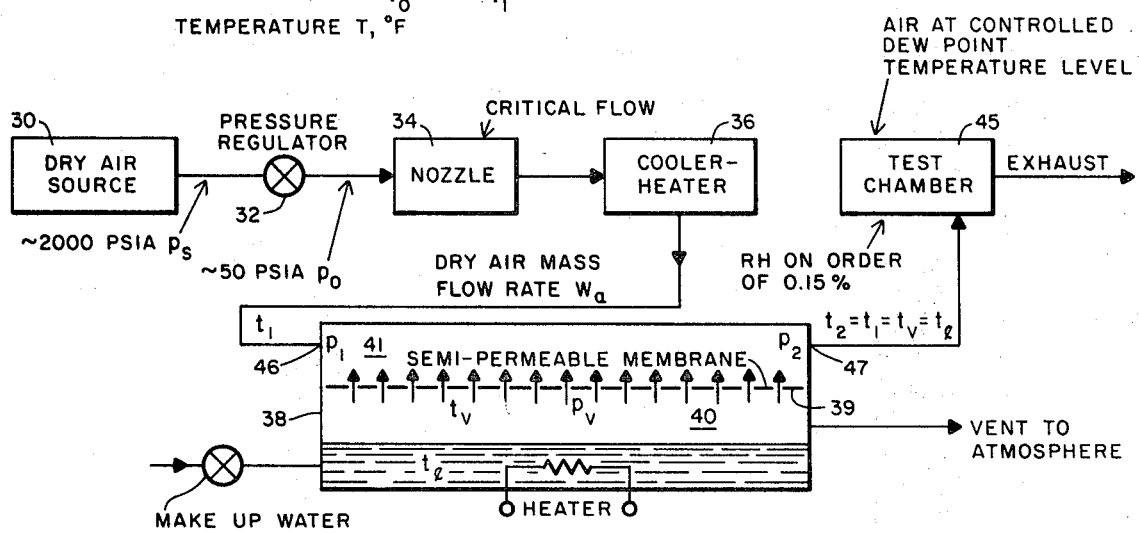
FIG. 6 is a diagram of a preferred embodiment of the partial pressure system of the present invention.
Figure 8:
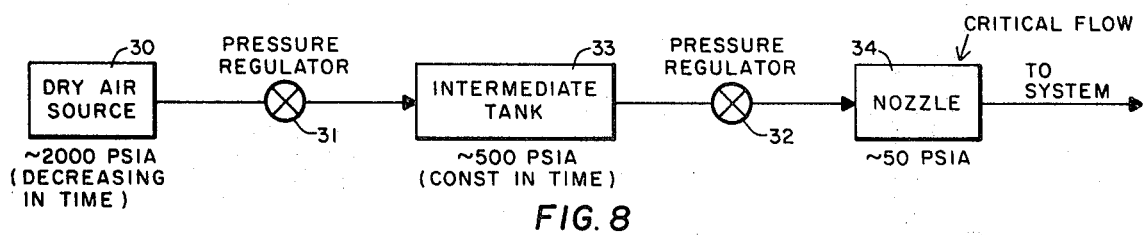
FIG. 8 shows an alternative in the embodiment of FIG. 6.

The humidifying chamber 38 shown in FIG. 6 consists of semipermeable membrane 39 separating two smaller chambers partially filled with water and having a heater for controlling the temperature $T_1$ of the water, as shown, one side 40 exposed to a water vapor chamber and the other side 41 exposed to the dry air stream flowing to the test chamber 45. The mass flow rate of water vapor across membrane 39 is dependent only upon the partial pressure difference of the water vapor across the membrane, and is independent of any other variable not affecting partial pressure. This is a new solution to the problem of adding extremely small quantities of water to a parcel of air under easily controlled conditions. The accuracy of this system depends primarily upon the regulation of nozzle upstream total pressure (velocity plus static) and the control over the vapor partial pressure in the water vapor section of the humidifier. The nozzle flow coefficient and the supply air temperature are not difficult parameters to hold constant. FIG. 8 merely shows that an intermediate tank 33 and additional pressure regulator 31 can be used between dry air source 33 and nozzle 34, if desired; tank 33 allows space to physically add additional components, such as a heat exchanger. A heat exchanger in intermediate tank 33, when used, allows control of the air mass flow rate as well as dry bulb temperature.

In FIG. 6 at humidifying chamber 38: $t_1$=temperature of air entering humidifier; $t_2$=temperature of air leaving humidifier; $t_l$=liquid water temperature; $t_v$=air-water vapor temperature; $p_1$=water vapor partial pressure into humidifier; $p_2$=water vapor partial pressure out of humidifier; $p_v$=water vapor saturation pressure at temperature $t_v$ $$\Delta_{p_m} = \frac{\Delta_{p1} - \Delta_{p2}}{l \frac{\Delta_{p1}}{n \Delta_{p2}}} = \frac{p_v - p_1 - p_v + p_2}{l \frac{p_v - p_1}{n p_v - p_2}}$$

$$\Delta_{p_m} = \frac{p_2 - p_1}{l \frac{p_v - p_1}{n p_v - p_2}}$$

Chamber 38 has a vent to atmosphere so that water vapor partial pressure may be increased at constant total pressure, thereby eliminating mechanical strength requirements on membrane. This vent is open at all times.

The English system of units is used in the following calculations. The discussion shall include calculations for nozzle dimensions, the required diffusion coefficient of the membrane, and the stability of the generated dew point temperature.

Nozzle dimensions: Given the general equation for the dry air mass flow rate per unit nozzle 34 throat area $A_*$ in terms of Mach number M and stagnation conditions, ("Introduction to Gas Dynamics," R. M. Rotty (Wiley, 1962) Chap. 5) the nozzle throat diameter $d_*$ required for a given mass flow rate may be determined;

$$A_* = (Mp_0)^{-1} \left(\frac{RT_0}{Kg_0}\right)^{1/2} \left(1 + \frac{K-1}{2} M^2\right)^{\frac{K+1}{2(K-1)}} W_a A_*$$

$$= (.61) 10^{-2} W_a = \frac{\pi}{4} d_*^2$$

where $A_*$ is in ft.$^2$ and $W_a$, the mass flow rate of air is in lb./sec., $g_o$ is the gravitational, acceleration constant; $p_o$ is the pressure at regulating valve 32 exit; R is the gas constant, 53.3 ft. $^{-\circ}R^{-1}$; and $K=C_p/C_v=1.4$. therefore, $d_* =1.06W_a^{1/2}$ inch.

Figure 7:
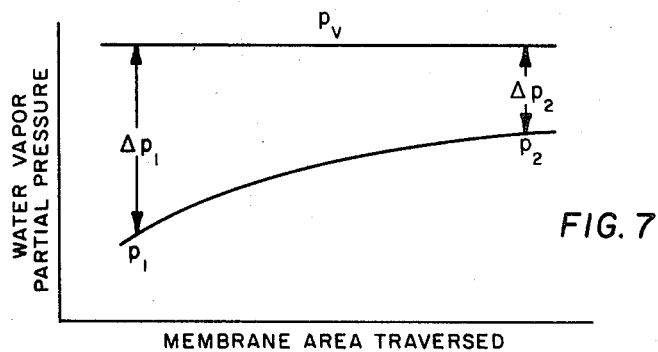
FIG. 7 is a typical curve showing the water vapor partial pressure difference across the semipermeable membrane as a function of membrane area traversed.

Required diffusion coefficient of the membrane—Referring to FIG. 7, as a reference condition assume that the specific volume of dry air at $+80°$ F. and atmospheric pressure passes through the dry side 41 of humidifier per hour. This mass flow rate of 1.0 lb./hr. is on the order of 10 times the amount required by commercial dew point hygrometers, and requires a throat diameter of $d_* =0.018$ inch diameter. Since the local partial pressure differential across the membrane will vary along the flow path, the mean partial pressure differential must be used. The equation for water vapor mass transfer $W_v = \overline{K}A\Delta p_m$ where $\overline{K}$ is the mass diffusion coefficient, sec.$^{-1}$; $\Delta p_m$ is the mean pressure difference across the membrane then reads $$W_v = \frac{\overline{K}A(p_2-p_1)}{l_n \frac{p_v-p_1}{P_v-P_2}} \text{ lb./sec.}$$

(see FIG. 7) and note that except for the case $\Delta p_1 = \Delta p_2$, $\Delta p < \frac{1}{2}(\Delta p_1 + \Delta p_2)$ where $\Delta p_1$ and $\Delta p_2$ are the pressure differences across the membrane at humidifier entrance and exit, respectively.

The assumption of dry air at a dew point of $-60°$ F. is valid; commercial bottled air is readily available at about $-75°$ F. dew point temperature. This amounts to $(3.5)10^{-5}$ lb. $H_2O$/lb. dry air specific humidity and a water vapor partial pressure of $(8.2)10^{-4}$ lb./in.$^2$ at the humidifier entrance 46. The corresponding values at the humidifier exit 47, at the upper design limit of $+60°$ F. dew point temperature, are $(1.1)10^{-2}$ lb. $H_2O$/lb. dry air and $(2.5)10^{-1}$ lb./in.$^2$. At a dry air mass flow rate through nozzle 34 of 1.0 lb./hr., the required mass flow rate of water vapor, for all practical purposes, is $(1.1)10^{-2}$ lbs. $H_2O$/hr. Substituting and solving for $\overline{K}A$, where the water vapor partial pressure on the wet side 40 of membrane 39 is taken at $+80°$ F., $$\overline{K}A = (1.1)10^{-2} \, l_n \frac{(5.1)10^{-1}-(8.2)10^{-4}}{(5.1)10^{-1}-(2.5)10^{-1}}$$
$$\overline{(2.5)10^{-1}-(8.2)10^{-4}}$$

$$= (3.0)10^{-2} \text{ in.}^2/\text{hr}\cdot$$

or $\overline{K}A = (8.3)10^{-6}$ in.$^2$/sec.

since $\overline{K}$ is usually expressed in units of sec.$^{-1}$.

The most difficult humidity level to hold will be at the lower design limit of $-60°$ F. dew point temperature. The rapidly increasing change in the dew point temperature per unit change in air moisture content at the lower humidity levels requires that extremely precise moisture metering methods be used in order to attain a desired dew point temperature with any degree of accuracy. It is for this reason that water vapor partial pressure is used on the wet side of the membrane.

The present system has the added advantage of negligible changes in the water vapor partial pressure per unit change in total pressure, i.e.—manipulating the Gibbs function and substituting:

$$(dp_v)_T = \frac{vl}{v_v} dp_t = \frac{.0161}{634} dp_t \cong (2.5)10^{-5}dp_t \text{ lbs./in.}^2$$

Further, when the membrane type and area, A, is chosen for the calculated required diffusion coefficient $\overline{K}A$ at the maximum conditions of moisture mass transfer, a low $\overline{K}$ value will be selected and the membrane area increased a proportionate amount. In this way the membrane can be mechanically blanked to a degree depending on the dew point temperature range desired. The control over the time rate of moisture mass transfer can then be adjusted entirely by regulating the temperature of the liquid water on the wet side of the membrane at any dew point temperature range. Repeating the preceding calculations for the diffusion coefficient at dry air dew point temperature of $-75°$ F. at the humidifier entrance and $-60°$ F. at the exit, $$\overline{K}A = \frac{[(3.5)10^{-5}-(1.3)10^{-5}]l_n \frac{.51-(3.0)10^{-4}}{.51-(8.2)10^{-4}}}{(8.2)10^{-4}-(3.0)10^{-4}}$$

$$= (4.3)10^{-5} \text{ in.}^2/\text{hr.}$$

or $\overline{K}A = (1.2)10^{-8}$ in.$^2$/sec.

and the demand on the humidifier section is reduced almost 3 orders of magnitude. Examples of materials usable for the semipermeable membrane are cellophane, goldbeater's skin and polyethylene of approximately 1 mil thickness.

Dew point temperature stability: In order to determine the stability of the dew point temperature, the reasonable assumptions were made that the nozzle flow coefficient is constant at the Mach 1 flow conditions, the (temperature controlled) water vapor partial pressure on the wet side of the membrane is constant, the temperature of the bottled dry air 30 pressure is constant, and the diffusion coefficient of the membrane film combination is constant under steady state flow conditions. The regulated air pressure $(p_o)$, however, depends on the bottled dry air source pressure $(p_s)$ so that the pressure at the nozzle inlet decreases $(2.0)10^{-2}$ lbs./in.$^2$ per 100 lbs./in.$^2$ decrease in bottle pressure.

The procedure in identifying the dew point temperature time rate of change due to depletion of supply pressure $p_s$ is:

(a) Derive the equation expressing regulated pressure $(P_o)$ as a function of supply pressure $(P_s)$, (b) Derive the expression for the time dependence of the bottled air supply pressure $(P_s)$, (c) Determine the effect of the time drift in supply pressure on the air mass flow rate, (d) Determine the change in specific humidity with time as affected by the change in air mass flow rate, determine the change in dew point temperature as affected by the change in specific humidity, and (e) Write the expression for the dew point temperature as a function of time.

This procedure also serves to identify the effect of dry air pressure fluctuations on the dew point temperature.

Using the characteristics of the pressure regulating valve chosen as representative, the published data describes the outlet pressure variation as .02 lb./in.$^2$ per 100 lb./in.$^2$ change in inlet pressure. Then $p_o = (2.0)10^{-4} p_s + C$, and if $p_o$ is initially set at 50 lbs./in.$^2$ and $p_s$ is, say, 2000 lbs./in.$^2$ then C=49.6 lbs./in.$^2$ so that Equation (a): $p_o = (2.0)10^{-4} p_s + 49.6$ lbs./in.$^2$.

The supply pressure $(p_s)$ will decrease at a rate dictated by the air mass flow rate in the equation of state so that $$\frac{d}{dt}p_s = -Z\frac{RT}{V}W_a$$

where $$\frac{d}{dt}p_s$$

is in lbs./ft.$^2$ sec and $W_a$ is in lbs./sec. The compressibility factor Z correcting for nonideal conditions (Z= .99717 at T=540° F. and P=100 atm.—"Tables of Thermodynamics and Transport Properties," J. Hilsenrath et al. (Pergamon Press Ltd., 1960) is very nearly 1.0 so no further note will be made of it. Expressing pressure in lbs./in.$^2$ and keeping $W_a$ in lbs./sec.

$$\frac{d}{dt}P_s = -7\frac{RT}{V}10^{-3}W_a$$

where V is the volume in ft.$^3$

At an estimated bottle volume of 1.8 ft.$^3$ and a temperature of $+80°$ F., this reduces to $$\frac{d}{dt}P_s = -112W_a \frac{\text{lbs.}}{\text{in.}^2-\text{sec.}}$$

and integrating.

Equation (b):

$$P_s = -112 W_a t + 2000 \; \text{lbs./in.}^2$$

since at $t=0$ the bottle pressure is at 2000 lbs./in.$^2$

Combining Equations (a) and (b), the (regulated) air pressure at the nozzle inlet may be expressed in terms of the air mass flow rate and time;

$$p_o = -(2.24)10^{-2} W_a t + 50 \; \text{lbs./in.}^2$$

It should be emphasized here that this dependence of $p_o$ on $W_a$ is the result of the reduction in air mass flow rate per unit time due to the decreasing supply pressure $p_s$ as this supply pressure affects $p_o$ through the regulating value. This description of $p_o$ is in terms of "upstream" conditions. Now $p_o$ can be described in terms of "downstream" (nozzle) conditions also;

$$p_o = (A_* M)^{-1} \left(\frac{RT^\circ}{Kg^\circ}\right)^{1/2} \left(1 + \frac{K-1}{2} M^2\right)^{\frac{K+1}{2(k-1)}} W_a \; \text{lb./ft.}^2$$

Combining these two equations the dry air mass flow rate through the humidifier 38 is described as a function of time;

$$p_o = (18)10^{+4} W_a = -(2.24)10^{-2} W_a t + 50 \; \text{lbs./in.}^2$$

Equation (c): $W_a = (3600 + .000448 t)^{-1}$ lbs./sec. and it should be noted that the magnitude of the coefficient of $t$ is a consequence of the supply air valve 32 regulation.

Since the dew point temperature becomes more sensitive to changes in the specific humidity as the specific humidity level is reduced, and since this temperature relationship over the entire operating range of this generator cannot be expressed in tractable mathematical terms the analysis that follows is done at both the upper and lower design limits.

The specific humidity (S), defined as the weight of moisture per lb. of dry air, may be written $S = W_v W_a^{-1}$ lbs. H$_a$O/sec. per lb. dry air/sec. If the water vapor mass flow rate across the membrane is constant at $(3.1)10^{-6}$ lb. H$_2$O/sec. [$(1.1)10^{-2}$ lb. H$_2$O/hr.] the equation $$S = (3.1)10^{-6} W_a^{-1}$$

lb. H$_2$O/lb. dry air, when combined with Equation (c), gives equation (d.1) $S = .0111 + 13.9 t 10^{-10}$ lbs. H$_2$O/lb. dry air at $+60°$ FDP and this describes the increase in the specific humidity with time as a result of the time rate of decrease of the dry air mass flow $W_a$. The same procedure applied at $-60°$ F. dew point temperature results in equation (d.2) $S = (2.2)10^{-5} + 2.73 t 10^{-12}$ lbs. H$_2$O/lb. dry air at $-60°$ FDP where at $t=0$ the specific humidity is not that for $-60°$ F. dew point temperature but is the increase in specific humidity from that at $-75°$ F. dew point temperature of the supply air to that at $-60°$ F. dew point temperature.

The dew point temperature plotted against the specific humidity is logarithmically linear over short arc lengths and the equations determined therefrom when combined with appropriate Equations (d.1) and (d.2) result in Equation (e.1) $°R = 659.8 \; (.0111 + 13.9 t 10^{-10})^{+.0529} \; °R$ at $+60°$ FDP and Equation (e.2) $°R = 606.2 \; [(2.194)10^{-5} + 2.73 t 10^{-12}]^{+.0403} \; °R$ at $-60°$ FDP.

The dew point temperature drift over 10 hours turns out to be on the order of $0.1°$ F. at the upper design point and on the order of half this amount at the lower design point. Although the sensitivity of the dew point temperature change to changes in air moisture content is greatly increased at the lower design point, the equation (e.2) is derived considering the fact that the supply air is at a humidity level not far removed from that required.

Determination of equations e.1 and e.2, Dew Point Temperature vs. Specific Humidity, using standard humidity tables:

Upper Design Point, $+60°$ F. $= 520°$ R.

$°R = AS^n$ $\log °R = n \log S + \log A$ $$n = \frac{\log °R_2 - \log °R_1}{\log S_2 - \log S_1} = \frac{\log 560 - \log 470}{\log (4.8) 10^{-2} - \log (1.75) 10^{-3}}$$

$$= \frac{2.74819 - 2.67210}{-2 + .68124 + 3 - .24304}$$

$$n = \frac{.07609}{1.43820} = .0529$$

$\log A = \log °R - n \log S = \log 520 - .0529 \log (1.11)10^{-2}$
$\log A = 2.71600 - .0529(-2 + .04532)$
$\log A = 2.81940$
$A = 659.8$
$\therefore °R = 659.8 S^{+.0529}$ Lower Design Point, $-60°$ F. $= 400°$ R.

$°R = AS^n$ $\log °R = n \log S + \log A$ $$n = \frac{\log °R_2 - \log °R_1}{\log S_2 - \log S_1} = \frac{\log 420 - \log 380}{\log (1.2) 10^{-4} - \log (1.0) 10^{-5}}$$

$$= \frac{2.62325 - 2.57978}{-4 + .07918 + 5 - 0}$$

$$n = \frac{.04347}{1.07918} = .0403$$

$\log A = \log °R - n \log S = \log 400 - .0403 \log (3.48)10^{-5}$
$\log A = 2.60206 - .0403 \; (-5 + .54158)$
$\log A = 2.78265$
$A = 606.2$
$\therefore °R = 606.2 S^{+.0403}$ The procedure in identifying the dew point temperature change due to variations in the saturation temperature on the liquid-vapor side of the humidifier consists essentially of inserting appropriate values in the equation for $$W_v = f(p_v)$$

At the lower design point, a $.1°$ F. drift in water temperature from $+80°$ F. results in about a $.05°$ F. change in dew point temperature. At the upper point, the same drift results in about a $.1°$ F. change. This does not take into consideration, however, the increase in the mean vapor partial pressure on the dry air side due to the increase in moisture mass flow rate, which in turn will tend to inhibit the increase in mass flow rate. Also the $\overline{K}$ value, which reflects not only the membrane characteristic but includes the effect of the moisture films on membrane 39 at specified mass flow rates, will tend to change in a predictable manner depending on the membrane used. This means that the $1°$ F.:$1°$ F. correspondence will be reduced considerably and a $1:.5$ correspondence or less between humidifier temperature and dew point temperature may be expected, depending on choice of membranes. Operating the humidifier 38 at a lower temperature will decrease the $dp/dT$ relationship by about another factor of 4.

What is claimed is:

1. A partial pressure low level humidity generator, comprising:
    (a) a pressurized dry air source,
    (b) a precision balanced pressure regulator,
    (c) a flow control device connected to said dry air source via said pressure regulator,
    (d) a heat exchanger,
    (e) an osmotic humidifying chamber,
    (f) air from said dry air source passing through said flow control device being directed through said heat exchanger and into said humidifying chamber,
    (g) said humidifying chamber providing air at the output thereof at controlled dew point temperature level.

2. A device as in claim 1 wherein said flow control device is a critical flow nozzle having the property of constant mass flow rate independent of variations in downstream pressure fluctuations.

3. A device as in claim 1 wherein said humidifying chamber comprises:
 (a) a semipermeable membrane separating said humidifying chamber into two smaller chambers, an upper and a lower chamber,
 (b) said upper chamber having an input and output whereby air passing from said heat exchanger to said humidifying chamber flows through said upper chamber,
 (c) said lower chamber being vented to the atmosphere and also having means for creating a water vapor therein,
 (d) one side of said semipermeable membrane being exposed to water vapor and the other side being exposed to dry air, the mass flow rate of water vapor across said semipermeable membrane being dependent only upon the partial pressure difference of the water vapor across the membrane.

4. A device as in claim 1 wherein an intermediate tank and pressure regulator are provided between said dry air source and flow control device to provide an area where additional desired equipment can be physically included in the system.

5. A device as in claim 3 wherein the material of said semipermeable membrane is selected from cellophane, goldbeater's skin and polyethylene.

References Cited
UNITED STATES PATENTS

| | | | |
|---|---|---|---|
| 3,444,092 | 5/1969 | Truhan | 252—359 |
| 3,479,164 | 11/1969 | Edler | 73—29 X |

WILLIAM E. WAYNER, Primary Examiner

U.S. Cl. X.R.

73—29; 165—3; 261—130